United States Patent [19]

Hinke et al.

[11] Patent Number: 4,538,082
[45] Date of Patent: Aug. 27, 1985

[54] HIGH-OUTPUT MAGNETIC FIELD TRANSDUCER

[75] Inventors: Walter Hinke, Ludwigsburg; Harry Kaiser, Markgröningen, both of Fed. Rep. of Germany

[73] Assignee: Robert Bosch GmbH, Stuttgart, Fed. Rep. of Germany

[21] Appl. No.: 389,585

[22] Filed: Jun. 18, 1982

[30] Foreign Application Priority Data

Jul. 16, 1981 [DE] Fed. Rep. of Germany ....... 3128031

[51] Int. Cl.³ .............................................. H02K 21/00
[52] U.S. Cl. .................................... 310/152; 310/155
[58] Field of Search ........................ 310/152, 155, 156

[56] References Cited

U.S. PATENT DOCUMENTS

| 4,004,167 | 1/1977 | Meckling | 310/152 |
| 4,117,401 | 9/1978 | Glauert | 310/155 X |
| 4,217,512 | 8/1980 | Hauler et al. | 310/155 |
| 4,256,986 | 3/1981 | Anderson | 310/155 |
| 4,268,771 | 5/1981 | Lace | 310/155 |
| 4,319,151 | 3/1982 | Klotz | 310/152 |

Primary Examiner—Donovan F. Duggan
Attorney, Agent, or Firm—Frishauf, Holtz, Goodman & Woodward

[57] ABSTRACT

To increase the output amplitude obtained from Wiegand wire transducers, for example of the type used in contactless ignition breaker systems, a flux concentration or flux guide element (3) of highly permeable material, for example high-frequency ferrite core material, is provided surrounding the Wiegand wire (1) and, at least in part, the pick-up coil (2) coupled thereto.

4 Claims, 7 Drawing Figures

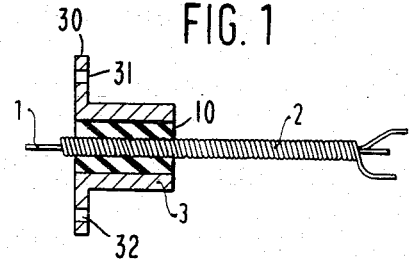
FIG. 1
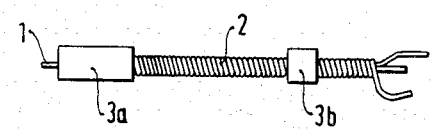
FIG. 2
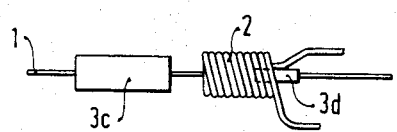
FIG. 3
FIG. 4
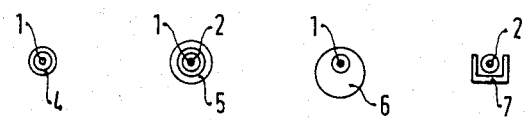
FIG.4a   FIG.4b   FIG.4c   FIG.4d

HIGH-OUTPUT MAGNETIC FIELD TRANSDUCER

The present invention relates to a magnetic field transducer, and more particularly to a magnetic field transducer utilizing a Wiegand wire which is subjected to a magnetic field of varying polarity, and especially to such a magnetic field transducer suitable to be used as a contactless ignition signal transducer, for example to replace mechanical breaker points in an ignition system for an externally ignited internal combustion (IC) engine, especially for automotive applications.

BACKGROUND

Various types of transducers are known in which electrical signals are obtained in dependence on change of magnetization of a magnetic field, typically by a magnet which passes a pick-up coil. Remagnetization, that is, change of polarity of magnetization, can be utilized to obtain sharp needle pulse type outputs, eminently suitable to determine a precise instant of time during which the change of magnetization occurs when a ferromagnetic wire, which is suitably pretreated, is used. Such effects are known as the Wiegand effects, and the wire, hence, is known as the Wiegand wire. The sharp abrupt remagnetization in the Wiegand wire will cause an induced current pulse in a pick-up coil coupled thereto. Transducers of this type are described in the literature, see, for example, "Eletronik 1980", issue No. 7, page 43.

The transducers which have been described provide induced output pulses which may not have a sufficiently high amplitude to be unambiguously distinguished from noise signals or other induced signals which can be picked up by the pick-up coil. It is, therefore, possible that noise pulses and actual change-of-magnetization pulses can be confused by evaluation circuitry coupled thereto, and if the evaluation circuitry includes an ignition system, may lead to command of erroneous ignition events.

THE INVENTION

It is an object to improve a contactless transducer utilizing a Weigand element, typically a Wiegand wire, in which the output amplitude is substantially increased over that heretofore obtainable, so that the output pulses can be unambiguously distinguished from noise pulses.

Briefly, a flux concentration or flux guide element is provided which surrounds the Wiegand wire at least in part, and additionally is magnetically coupled to the pick-up coil wound about the Wiegand wire.

In accordance with a feature of the invention, the flux concentration element is a tubular ferromagnetic structure which, simultaneously, serves as a mechanical support or mechanical holding element for the transducer wire and the pick-up coil.

The transducer in accordance with the invention has the advantage that the output pulses induced in the pick-up coil are substantially higher than those obtainable from previously known transducers; output pulses of approximately twice previously obtained amplitude can be obtained. It is thus possible to render internal combustion engine ignition breaker assemblies substantially less sensitive to malfunction and extraneous disturbances.

In accordance with a preferred embodiment of the invention, the flux concentration element is a tubular ferromagnetic structure which is slipped over the Wiegand wire directly, or over the Wiegand wire - pick-up coil assembly. In accordance with another preferred embodiment, the flux concentration element is made of highly permeable material which is shaped to form the holder for the Wiegand wire - pick-up coil combination to thereby provide at the same time a holding structure therefor and thus a unitary sensor. External and additional holding structures for the Wiegand wire are not needed.

DRAWINGS

FIG. 1 is a part-sectional side view of a Wiegand transducer;

FIG. 2 is a side view of another embodiment;

FIG. 3 is a side view of yet another embodiment; and

FIGS. 4a, 4b, 4c and 4d are end views of various embodiments of a sensor - transducer assembly in which various configurations and shapes of the highly permeable element are shown.

A wiegand wire 1 - see FIG. 1 - is surrounded by a pick-up coil 2. Upon exposure of the Wiegand wire 1 to a magnetic field which changes its polarity, the Wiegand wire 1 is remagnetized likewise with changed polarity. The Wiegand wire will change polarity abruptly, thus inducing a pulse in the pick-up wire 2. The amplitude of the pulse is comparatively high due to the high rate-of-change of the magnetic field of the Wiegand wire as it changes its polarity. Thus, depending on the external construction of the magnetic field generating system and its association with the Wiegand wire, proximity switches, speed transducers, angle position transducers and the like can be constructed. It is only necessary to so arrange an external magnet that the magnetic field acting on the Wiegand wire 1 changes polarity in dependence on the physical parameter to be measured, for example by relative movement of a permanent magnet with respect to the Wiegand wire sensor or transducer system, including the Wiegand wire and the pick-up coil 2.

The voltage induced in the pick-up coil 2, under certain operating conditions and in some environmental locations, is subject to extraneous electrical noise, and may have insufficient amplitude, so that the output from the Wiegand wire may be masked by noise pulses.

In accordance with the invention, the magnetic field is amplified by providing an element 3, made of highly permeable material, such as ferrite or soft iron, and coupled to the Wiegand wire 1 and, preferably, to the pick-up coil 2. The element 3 amplifies the magnetic field or concentrates the magnetic field, and thus increases the signal amplitude obtained from the pick-up coil upon change-over of polarization of the Wiegand wire.

As seen in FIG. 1, the element 3 can be a single structure. It can serve, additionally, as a holding structure for the Wiegand wire 1 - pickup-up coil 2 combination, by means of a flange 30, attached to the element 3, having holes 31, 32 to receive fixing screws or the like. A casting compound, for example a suitable thermosetting plastic 10, is located between the sleeve or tube 3 of ferrite or soft iron material, to hold the wire 1 - coil 2 combination in place. The tube 3 can be formed with suitable attachment lugs or clamped in position by, for example, a plastic strap or the like.

The flux concentration element may be a single structure or single unit 3 - see FIG. 1; it may, however, also be made in multiple components or parts - see FIG. 2. Two elements 3a, 3b are used, spaced along the Wiegand wire - coil combination 1, 2. As seen in FIG. 3, the two elements may have different diameters; for example, the larger element 3c surrounds only the Wiegand wire; the smaller element 3d is positioned at least in part within the pick-up coil 2, closely surrounding the Wiegand wire.

The structure can be made extremely small, and if the combination of wire 1 and pick-up coil 2 is constructed to require only little space, the element 3 may be a standard high-frequency ferrite core, commercially available in various dimensions and material compositions.

The magnetic elements may have different cross sections and shapes, as illustrated in the examples of FIGS. 4a to 4d. Thus, element 4 - FIG. 4a - is a tube concentrically surrounding the wire 1. Element 5, FIG. 4b, is a tube of larger diameter, externally concentrically surrounding wire 1 and coil 2, that is, similar to the structure shown in FIG. 1. Element 6 is a ferrite core with an opening therein which is eccentric with respect to the axis of the tubular core element 6, the opening being small and surrounding only the wire 1. It is not necessary that the flux guide or flux concentration element entirely surround the wire 1 and/or the coil 2; FIG. 4d illustrates an element 7 made of highly permeable material surrounding wire 1 and coil 2 only partly; in end view, element 7 has essentially U-shaped configuration.

A holding element for the combination of the wire 1 and pick-up coil 2 may be provided, consisting of magnetic, highly permeable material which at least partly surrounds the wire 1 and preferably also coil 2, and provides for mechanical support thereof. Thus, a single element may serve as a mechanical holder and signal amplification device.

Various changes and modifications may be made, and features described in connection with any one of the embodiments may be used with any of the others, within the scope of the inventive concept.

We claim:

1. High-output magnetic field transducer, particularly for a contactless ignition signal system for use with an internal combustion engine, having
   a mechanically treated ferro-magnetic Wiegand element (1) which abruptly changes its magnetization when exposed to a magnetic field of changing polarity,
   and a pick-up coil (2) surrounding the Wiegand element, and comprising, in accordance with the invention, a flux concentration element (3, 3a, 3b, 3c, 3d, 4, 5, 6, 7) surrounding, at least in part, said Wiegand element (1) along at least a longitudinal portion thereof and being magnetically coupled to the pick-up coil, the flux concentration element comprising highly magnetically permeable material having a magnetization direction changeable in response to the magnetization of said Wiegand element (1); and
   wherein said flux concentration element (3, 3a, 3b, 3c, 3d, 4, 5, 6) comprises a tubular structure.

2. Transducer according to claim 1, wherein said tubular structure comprises a high-frequency ferrite core structure.

3. High-output magnetic field transducer, particularly for a contactless ignition signal system for use with an internal combustion engine, having
   a mechanically treated ferro-magnetic Wiegand element (1) which abruptly changes its magnetization when exposed to a magnetic field of changing polarity,
   and a pick-up coil (2) surrounding the Wiegand element, and comprising, in accordance with the invention, a flux concentration element (3, 3a, 3b, 3c, 3d, 4, 5, 6, 7) surrounding, at least in part, said Wiegand element (1) along at least a longitudinal portion thereof and being magnetically coupled to the pick-up coil, the flux concentration element comprising highly magnetically permeable material having a magnetization direction changeable in response to the magnetization of said Wiegand element (1); and
   wherein the Wiegand wire element comprises a wire, the pick-up coil is wrapped or wound around the wire, and the highly permeable element comprises a tubular structure at least in part surrounding the wire - pick-up coil combination.

4. High-output magnetic field transducer, particulary for a contactless ignition signal system for use with a internal combustion engine, having
   a mechanically treated ferro-magnetic Wiegand element (1) which abruptly changes its magnetization when exposed to a magnetic field of changing polarity,
   and a pick-up coil (2) surrounding the Wiegand element, and comprising, in accordance with the invention, a flux concentration element (3, 3a, 3b, 3c, 3d, 4, 5, 6, 7) surrounding, at least in part, said Wiegand element (1) along at least a longitudinal portion thereof and being magnetically coupled to the pick-up coil, the flux concentration element comprising highly magnetically permeable material having a magnetization direction changeable in response to the magnetization of said Wiegand element (1); and
   wherein the flux concentration element also constitutes a holding means securing the Wiegand wire and the pick-up coil together to form a single mechanically connected structural element.

* * * * *